United States Patent [19]

Weiser

[11] 3,743,427
[45] July 3, 1973

[54] MODULATION TRANSFER FUNCTION MEASUREMENT SYSTEM AND METHOD

[75] Inventor: Sidney Weiser, Silver Spring, Md.

[73] Assignee: Weiser/Robodyne Corporation, Silver Spring, Md.

[22] Filed: June 29, 1971

[21] Appl. No.: 157,834

[52] U.S. Cl. .............................. 356/124, 250/232
[51] Int. Cl. .......................... G01b 9/00, G01b 5/36
[58] Field of Search .................... 356/124, 125, 126, 356/127; 250/232

[56] References Cited
UNITED STATES PATENTS
3,438,713  4/1969  Heynacher et al. .................. 356/124

Primary Examiner—Ronald L. Wibert
Assistant Examiner—Conrad Clark
Attorney—Rose & Edell

[57] ABSTRACT

A constant speed rotating drum having a plurality of circumferentially spaced bar patterns of different discrete spatial frequencies is employed to measure the modulation transfer function (MTF) of a lens or other optical unit under test. A slit image input is degraded by the unit under test which thereby produces a spread function in its output plane. The spread function is scanned by a bar pattern and detected by a photosensor to provide an electrical square wave signal which is distorted to a degree determined by the spread function. Each bar pattern generates a different square wave frequency which is passed by a respective narrow bandpass filter tuned to its fundamental frequency. Each filter is gated on only when its associated bar pattern is rendered operative to scan the spread function. The amplitude of the passed fundamental frequency is then detected as a measure of the MTF. Scanning by the bar pattern may be at either the input or output of the unit under test.

23 Claims, 7 Drawing Figures

INVENTOR
SIDNEY WEISER

INVENTOR
SIDNEY WEISER

MODULATION TRANSFER FUNCTION MEASUREMENT SYSTEM AND METHOD

BACKGROUND OF THE INVENTION

The present invention relates to optical measuring equipment and, more particularly, to a system for accurately measuring the modulation transfer function (MTF) of an optical unit or system under test.

The basic task of measuring the resolution capability of lenses and optical systems has existed for many years. Virtually since the invention of the telescope and the microscope resolution measurements have been made by viewing stars and microorganisms. These measurements were adequate enough to allow the theoretical designs for these instruments to be well developed by 1900. However, with the invention of the camera and the projector, the requirement for more refined resolution measurements became necessary.

To meet this need, the U.S. National Bureau of Standards developed a three bar resolution target in the 1930's for making measurements of lens resolution. These targets were later refined by the Air Force and are now available as a standard pattern for qualitative visual and photographic measurements. However, the three bar resolution target gives a measure of only the limit of resolution and little information about sharpness or "edge gradient" as it is called by photographers.

During the period from 1940 to 1960, such effort was directed toward developing a measurement technique which would correlate lens performance with calculated design data.

The first approach to a quantitative measure of lens resolution consisted of scanning bar patterns with a suitably small spot of light and detecting the resulting alternating electrical signal. This technique experienced much refinement and finally was defined as the contrast transfer function (CTF) expressed in percent. More specifically, $CTF = W-B/W+B \times 100$ where $W$ is the peak and $B$ the valley of the alternating electrical signal. However, correlation between CTF and calculated data for the tested lens or system still lacked the desired agreement. Further investigation showed that the deterioration of image quality in a test lens could be correlated to a spread function. Using the Fourier Transform Theory for linear systems, derived from work in electronics, the rationale for modulation transfer function (MTF) measurements was developed. However, it was apparent that such work was required on the system components to get the stability and accuracy necessary to correlate these measurements with theoretical calculations. The difficulty of this problem, which includes the performance of photosensors, optical relay systems, light sources, test patterns, etc. has been so great that MTF test equipment having any degree of reliability has only been available for the last few years. Correlation studies are still being made and data is still being collected by many scientific groups to further confirm this new technique. However, with the advent of MTF, it is now possible to define the performance of an optical system in terms of percent modulation at a specific spatial frequency (cycles per millimeter). This quantitative measure of resolution is the tool optical designers have sought for many years to measure the effectiveness of their theoretical designs. Reliable MTF measurements are also needed for quality control in the manufacture of optical components and systems.

Accuracy and stability problems are the most significant impediments to reliable prior art MTF measurements. In some cases these problems can be traced to inaccuracies and instabilities in components of the measurement system. Some of these components can be improved; others are limited by the state of the art. The present invention is concerned primarily with improvements in the image analyzer portion of MTF measuring equipment, an area where considerable improvement is required.

The image analyzer is the unit which converts the spread function of the target image produced by the test lens into a quantitative measure of percent modulation.

This unit requires high quality relay optics to transfer the output image of the test lens (spread function) to a plane where it can be analyzed.

There are a number of basic ways to derive the modulation transfer function from the spread function of the slit image. These essentially depend upon taking the Fourier Transform of the slit image and are classified as follows:

1. Static Method

This method uses an infinitely small slit which is scanned across the spread function to convert it to a digital electrical signal which can be processed by a digital computer. A system employing this method is disclosed in U.S. Patent No. 3,519,358. The advantage of this approach is the relative simplicity of equipment. However, the scanning slit must be at least 1/100 the width of the spread function. Since this is not always possible for a narrow target slit, a single knife edge may be used. However, to obtain the required accuracy to digitally compute a good Fourier Transform, a very large number of samples must be taken across the spread function. These samples must be taken at very minute intervals approaching the limit of accuracy physically possible, e.g., 1/10 wavelength of light. At each of these positions, the light level must be digitized and logged in a computer-compatible manner. If any small deflection occurs due to vibration, the light level does not correspond to the appropriate position, introducing a basic error in data. This necessitates averaging a number of scans to reduce errors and becomes a very lengthy measuring procedure. In addition, the location of the plane of best focus can only be determined from the plotted MTF curve. Therefore, it is necessary to store the data as well as the plotted MTF curves for approximately 10 image planes to determine the location of the plane of best focus. Additional information on this technique is contained in a recent report, No. AFAL-TR-70-93, Lens Test Standardization Study, by Robert E. Hopkins and David Dutton of the University of Rochester, July, 1970, sponsored by the Air Force Avionics Laboratory, Wright-Patterson Air Force Base, Ohio. The data taken in this study was for monochromatic light at 5,461° Angstroms in the green region and 6,328° Angstrome in the red region. These data show variations as high as ±0.04 in measurements made by this method.

2. Dynamic Method

There are a number of dynamic methods for measuring the modulation transfer function of an optical system. These methods all utilize a scan which consists of a number of patterns in the form of a grating so that a repetitive analysis of the spread function is achieved. This tends to give a degree of averaging which eliminates the uncertainty of position of the static method and allows the focusing to be easily optimized during the setup procedure. The dynamic method may present a continuously variable spatial frequency gradient or a finite set of discrete spatial frequencies. These may be sinusoidal to give a direct optical Fourier Transform or of the square wave type which require an electronic computation of Fourier Transform. The accuracy and stability of the system depends primarily upon the accuracy of the scanning pattern and the stability of the translation system.

a. Sinusoidal Pattern

A sinusoidal pattern may be made in either variable area or variable density configurations. A variable area pattern has the advantage that it can be made on high contrast, high resolution film to give a very high percentage of modulation. However, high distortion of the signal occurs near 100 percent modulation where the peaks of the image sine waves may overlap. It is also difficult to make a precise variable area pattern in a suitably wide track width without experiencing phase distortion. The wide pattern is required to maximize the signal-to-noise ratio which can be obtained from a long target slit. A variable density sinusoidal pattern may be made more precisely to eliminate phase distortion; however, it has only a limited range of modulation determined by the linear region of the gamma curve of the photographic material. This type of linear photographic film has a maximum linear density range of approximately 4:1, and the maximum density is considerably less than high contrast, high resolution film. The resolution limitations of this linear film tends to decrease the signal-to-noise ratio. The maximum width of the variable density sinusoidal pattern (from 35 millimeter sound track technology) is approximately 0.100 inch. With this pattern, 90 percent of the energy in the target slit image would be waster, further reducing the signal-to-noise ratio. For these reasons, many of the past attempts to perform the Fourier Transform optically have resulted in unsatisfactory systems having low accuracy and repeatability. The principal theoretical fallacy of this system is the low percentage of modulation, e.g., 75 percent derived from a 4:1 density range. This will give no usable signal below 25 percent modulation when the signal is normalized to 100 percent. This system introduces a potential region of error below 25 percent modulation. The limitations of a variable density sinusoidal pattern, therefore, are based on the limited linearity of photographic film. These limitations are independent of the scanning pattern configuration, e.g., linear, disc, or drum type.

Another problem of sinusoidal patterns is that the spatial frequency cannot be verified optically. It must be analyzed electro-optically to verify frequency as well as distortion. This makes it dependent upon other system elements. Where the sinusoidal pattern sweeps over a frequency range, it is very difficult to analyze the harmonic distortion which is particularly important in producing a good Fourier Transform.

b. Square Wave Pattern

Square wave patterns have been used to produce the scanning function needed to get a repetitive spread function of the target image. This repetitive spread function is actually the contrast transfer function. The signal also can be simply processed electronically through a Fourier Transform which produces the modulation transfer function. One of the basic advantages of this approach is the very high quality attainable in the bar pattern. Not only can this type of pattern be made but it can be checked in an optical comparator. This pattern can be reproduced on high contrast, high resolution film which has a denisty range from less than 0.02 in the clear areas to greater than a density of 2.0 in the dark areas. This assures a modulation of 100 percent and makes it possible to approach a system accuracy of 1 percent.

c. Scanning Configurations

There are a number of configurations which may be used to accomplish the scanning process. Essentially, the pattern must be moved across the axis of the relay optics at a constant rate to convert the spatial frequency into a temporal frequency. This can then be electronically processed to provide a readout.

1. Linear Scanning

The spatial frequencies can be oriented in a linear pattern and translated across the optical axis by a slide mechanism. This translation can be done only for a finite time since it must stop at the end of the pattern. The principal disadvantages of this translation method are speed regulation, the discontinuity in temporal frequency when the pattern reaches the end, and the vibration introduced by reversing direction in the scan.

2. Rotary Scanning

There are two principal types of rotary scanning. The pattern may be placed on the face of a disc which is rotated or it may be placed on the circumference of a drum. Rotary scanning can be accomplished with better speed control, at higher speeds, and with less vibration. The disadvantage of a disc is that only a very short radial pattern width may be used, reducing the signal-to-noise ratio. This is balanced by the relative low cost and ease of fabrication.

A drum type scanner is more difficult to fabricate but has the same speed regulation advantages of a disc with a potentially higher signal-to-noise ratio since the pattern can be made as wide as necessary. If the drum is large in diameter, it can be considered flat in the image plane of the relay optics. Generally, then, drum type scanning of square wave patterns appears to by the most advantageous approach to image analysis in MTF measurement systems.

In analyzing the optimum MTF system, it is necessary to compare scanners which present a continuous gradient of spatial frequencies and those which present single discrete frequencies. Many lens designers state they would prefer one precise MTF at a single spatial frequency to check against their theoretical calculations to a full range plot of lower precision. In making the MTF measurement, the assurance that the percent modulation is correct is based upon the spatial frequency being constant during the data reduction. If a gradient in spatial frequency is present during the data reduction, then only an average value of modulation results. This occurs when the spread function from the test lens is passed through a pattern containing a number of spatial frequencies. Consequently, it may be expected that an error in MTF readout will occur at any point of inflection or at a non-linear variation in spatial frequency scan rate. In a system using a continuous variation in spatial frequency, the data readout can be only as accurate as the potentiometric readout of drum position. If this change is non-linear, then the error in plotting spatial frequency may be large. For these reasons, a system using discrete spatial frequencies, presented individually to the spread function of the target image, is preferred.

One prior art system employing a discrete frequency drum type scanner of square wave patterns is disclosed in U.S. Pat. No. 3,438,713 to Heynacher et al. In that system discrete frequency bar patterns are arranged circumferentially about the drum without spacing between patterns. The spread function produced by the unit under test is scanned by each pattern in succession and the photo-detected output signal is fed to a plurality of parallel-connected bandpass filters. Each filter is tuned to a different frequency corresponding to the fundamental frequency of the square wave produced by a respective bar pattern. In theory, each filter provides an output signal with an amplitude representative of MTF when the bar pattern associated with that filter scans the spread function. The passed signal is recorded or displayed for evaluation.

In practice the Heynacher et al. approach is fraught with problems. For one thing the filters require a finite time to build up to steady state condition and exhibit a tendency to ring when the input frequency changes suddenly. Since each successive pattern abuts the preceding pattern on the Heynacher et al. drum, all of the filters ring at the transition between bar patterns. The result is a highly distorted output signal from the parallel filters and a resultant inaccuracy in MTF measurement. Moreover, the transition regions between adjacent patterns produce output signals from two filters simultaneously, apart from ringing effects, thereby confusing the measurement. In order to provide sufficient time for the filters to stabilize, the length of each pattern would have to be increased (so that only a relatively small number of patterns can fit on the drum), or the drum speed would have to be very slow (thereby placing the temporal frequencies in the low frequency ranges at which noise becomes a problem and filters become expensive), or the size of the drum would have to be prohibitively large. Each of these alternatives also has the disadvantage of lengthening the time required to perform an MTF measurement over the entire range of spatial frequencies.

Another problem with the Heynacher et al. system is that it does not afford the user the ability to test at only one spatial frequency of interest. Rather, all spatial frequencies must be scanned.

A crucial disadvantage of the Heynacher et al. system is its inability to provide an absolute calibration of MTF; instead all MTF measurements are made relative to one another.

A still further problem of the Heynacher et al. system is the lack of facility for visual examination of the image projected through the lens or other unit under test. Such a facility would permit the operator to discern various aberrations which could go unnoticed by Heynacher et al.

It is therefore an object of the present invention to provide an approach to measuring MTF which is free from the aforementioned problems of the prior art. More particularly it is an object of the present invention to measure MTF with a discrete frequency drum type scanner of square wave patterns wherein interference between measurements at different spatial frequencies is eliminated and measurement time is kept short.

It is another object of the present invention to provide a novel drum-type scanner for MTF measurements.

It is still another object of the present invention to provide improved electronic circuitry for processing photo-detected signals received from a drum-type scanner in an MTF measurement system.

SUMMARY OF THE INVENTION

According to the present invention an image analyzer in an MTF measurement system includes a drum rotating at constant speed and having multiple bar patterns of different discrete spatial frequencies spaced from one another circumferentially about the drum. The spatial frequencies can be manually selected, in response to which scanning at only the selected spatial frequency is processed during each drum revolution. In an automatic mode the bar patterns sequentially scan the spread function of the lens or other unit under test, a different bar pattern scanning the spread function during each drum revolution. With this approach filters are sequentially gated on and thereby permitted to reach steady state conditions before measurements are made. The resulting output signal is gated to a storage circuit and updated once each drum revolution. Circuitry is also provided to record the output signal directly on an x-y recorder, providing an immediate plot of the MTF curve for the unit under test.

In an alternative embodiment the drum scanner is employed at the input to the unit under test and a stationary slit is employed to conduct the output from the unit to the photo-detector.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
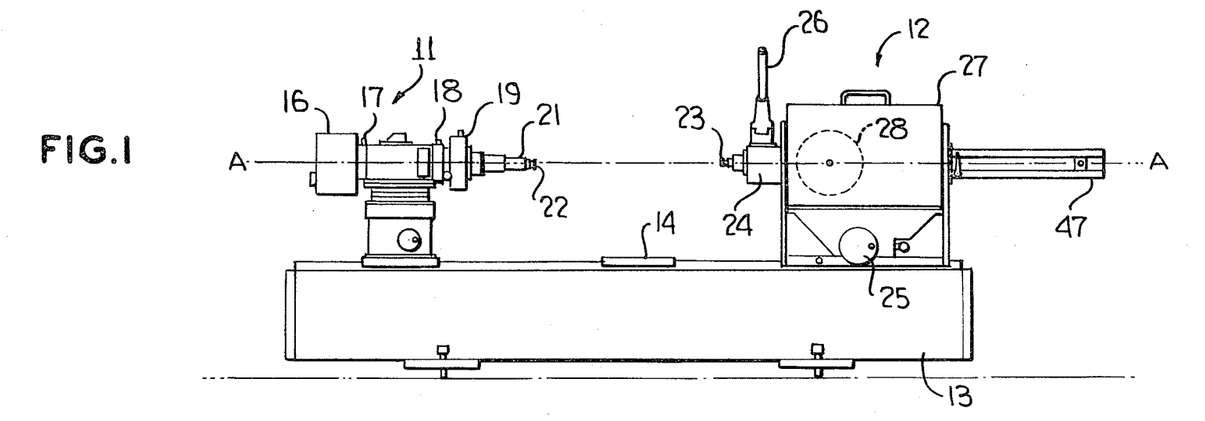
FIG. 1 is a plan view of an MTF measurement system according to the present invention.

Referring specifically to FIG. 1 of the accompanying drawings, there is illustrated a finite conjugate MTF measurement system comprising a source generator 11 and image analyzer 12 mounted on an optical bench 13. A slide 14 is also mounted on the bench and is positionally adjustable along a path between the source generator and image analyzer. Slide 14 is adapted to receive and engage a lens, an image intensifier tube, or similar unit to be tested. The entire source generator 11 is mounted on an adjustable elevation table 15 which in turn is mounted on bench 13.

The source generator 11 includes a light source 16 which, for example, may be a MOdel 136 Precision Light Source manufactured by the Weiser/Robodyne Corporation, Silver Spring, Marylind. Such a source includes a 100 watt quartz iodine lamp and two reciprocating attenuator slides 17, 18 for adjusting the output light intensity to output levels between 0.01 and 100 foot-candles. A variety of neutral density filters is preferably included as part of the source. Light source 16 is powered by a well-regulated power supply (not shown) such as Weiser/Robodyne Model 117-1R.

Light output from source 16 is fed through a rotary slit assembly 19 to a projection microscope 21 and in turn through a high quality microscope objective 22 for reducing the effective slit size. Rotary slit 19 may, for example, be Weiser/Robodyne Model 137-1; microscope 21 may, for example, be Weiser/Robodyne Model 138. Microscope objective 22 may, for example, be a 10X planoapochromatic objective with a numerical aperture of 0.32 to provide performance up to the diffraction limit. The rotary slit 19 includes a vernier control for providing optical slits of one to one hundred microns in width, the slits being rotatable about the central axis A—A of the system.

Light passed through microscope objective 22 passes through the unit under test to a relay lens 23 and scanning microscope 24 at the image analyzer 12. Relay lens 23 is preferably replaceable to achieve various degrees of magnification. For purposes of the present invention, lens 23 is assumed to be 12x apochromatic objective having a numerical aperture of 0.30. Scanning microscope 24 may, for example, be Weiser/Robodyne Model 144 which includes a rotating mirror which may be actuated to reflect the received slit image up through inclined eyepiece 26. When the mirror is not actuated the slit image is passed to slit resolver 27.

Slit resolver 27 includes a rotary drum 28 oriented such that the received slit image is projected perpendicularly on its rotating circumferential wall. The circumferential wall is preferably metal having discrete openings located in the regions of the bar patterns described below. When the wall is metal the bar patterns are formed on a film strip secured to the wall. Alternatively the drum wall may be a transparent material with dark portions of the bar patterns comprising a glue silver emulsion painted on the drum wall.

Figure 4:
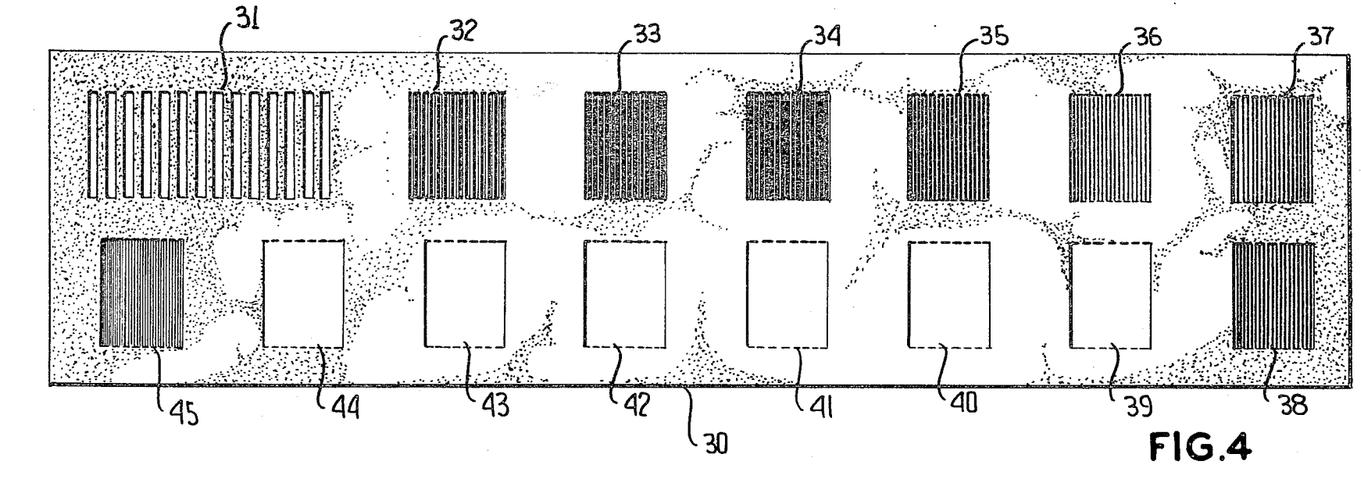
FIG. 4 is a plan view of a template utilized in laying out the different bar patterns on a drum according to the present invention.

A template 30 utilized in fabricating a film strip of bar patterns for an apertured metal drum is illustrated in FIG. 4. The film strip made from the illustrated template is actually cut in half longitudinally and the resulting two longitudinal sections are glued or otherwise secured to the drum in one continuous strip of successive bar patterns of increasing spatial frequency. By way of example only, 15 bar patterns are illustrated in FIG. 4 and are designated by the numerals 31 through 45 inclusive. Pattern 31 has the lowest spatial frequency and is considerably longer (circumferentially) than the other patterns in order that a sufficient number of cycles may be present for analysis. The remaining patterns are of roughly the same length and increase in spatial frequency through pattern 45, the highest. Importantly, each pattern is spaced from its immediately preceding and succeeding patterns by approximately the nominal pattern length. As will be fully explained subsequently, spacing between the patterns is provided to prevent interference in the electronics portion of the analyzer. Each of patterns 31-45 overlies a respective aperture of like size provided in drum 28. In the film strip made from template 30, the clear bar section should have a neutral density of ND-0.1 or less and the opaque bars and spaces surrounding the patterns should be ND-2 or more.

Figure 6:
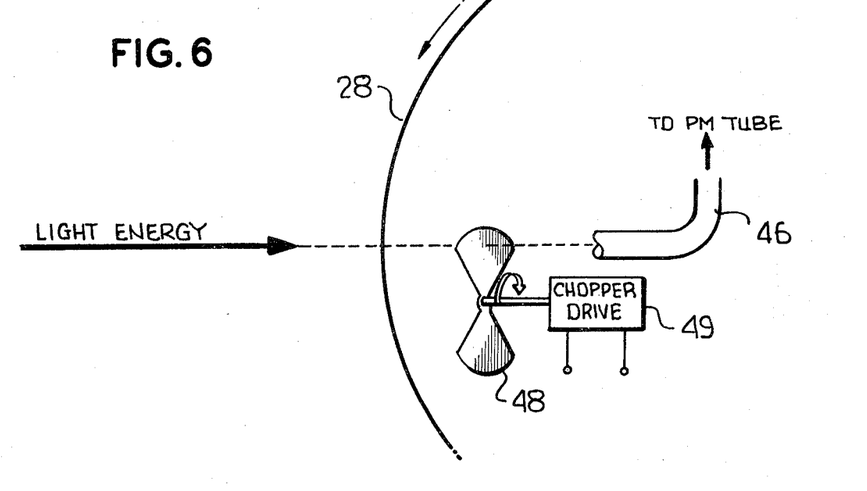
FIG. 6 is a diagrammatic representation of a portion of the image analyzer utilized in the embodiments of FIGS. 1 and 2.

As best illustrated in FIG. 6, interiorly of drum 28 there is provided a light conducting tube 46 which is aligned with the slit image received by slit resolver 27. Tube 46, which may be a closed tube with a reflective inner surface or a fiber optic unit, conducts received light to a photomultiplier tube 47 (FIG. 1) mounted on the slit resolver. A selectively actuable rotatable two-bladed light chopper 48, controlled by a control unit 49 is operable during calibration procedures to interrupt the light received by tube 46 at a predetermined calibration frequency. During operation the chopper is positioned to permit free passage of light to tube 46. Photomultiplier 47 may, for example, be Weiser/Robodyne Model 145, and serves to convert received light intensity to a proportional voltage.

The slit resolver unit 27 is rotatably mounted and controllably rotated through an angle of at least 90° about the central axis A—A of the system by means of control 25. This permits the bars of the patterns on the drum to be oriented either horizontally or vertically and is therefore operable with rotary slit 19 to permit both tangential and sagittal measurements to be made.

Figure 2:
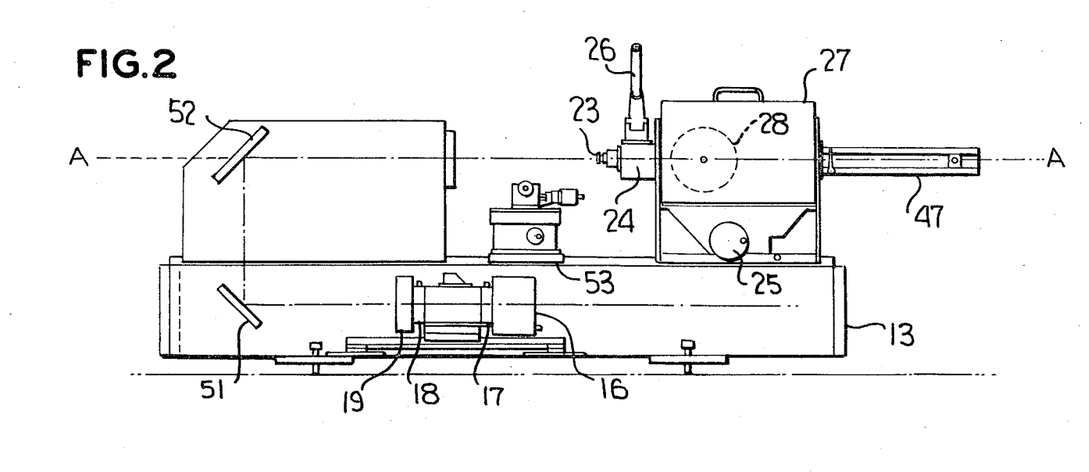
FIG. 2 is a plan view of a first alternative embodiment of the MTF measurement system according to the present invention.

Whereas the system of FIG. 1 is a finite conjugate system, a corresponding infinite conjugate version of the system is illustrated in FIG. 2. Like components in FIGS. 1 and 2 are designated by the same reference numerals. The infinite conjugate system effectively images the stationary slit at infinity relative to the unit under test. To achieve this an achromatic collimation system is utilized and includes a folded optical path to conserve bench length. The light slit issued from rotary slit 19 is reflected by a series of mirrors 51, 52 to pass through the unit under test mounted on an x-y micrometer slide assembly 53. The latter may, for example, be Weiser/Robodyne Model 149 and may be employed in place of bench slide 14 of FIG. 1. In other respects the system of FIG. 2 is identical to that of FIG. 1.

Figure 5:
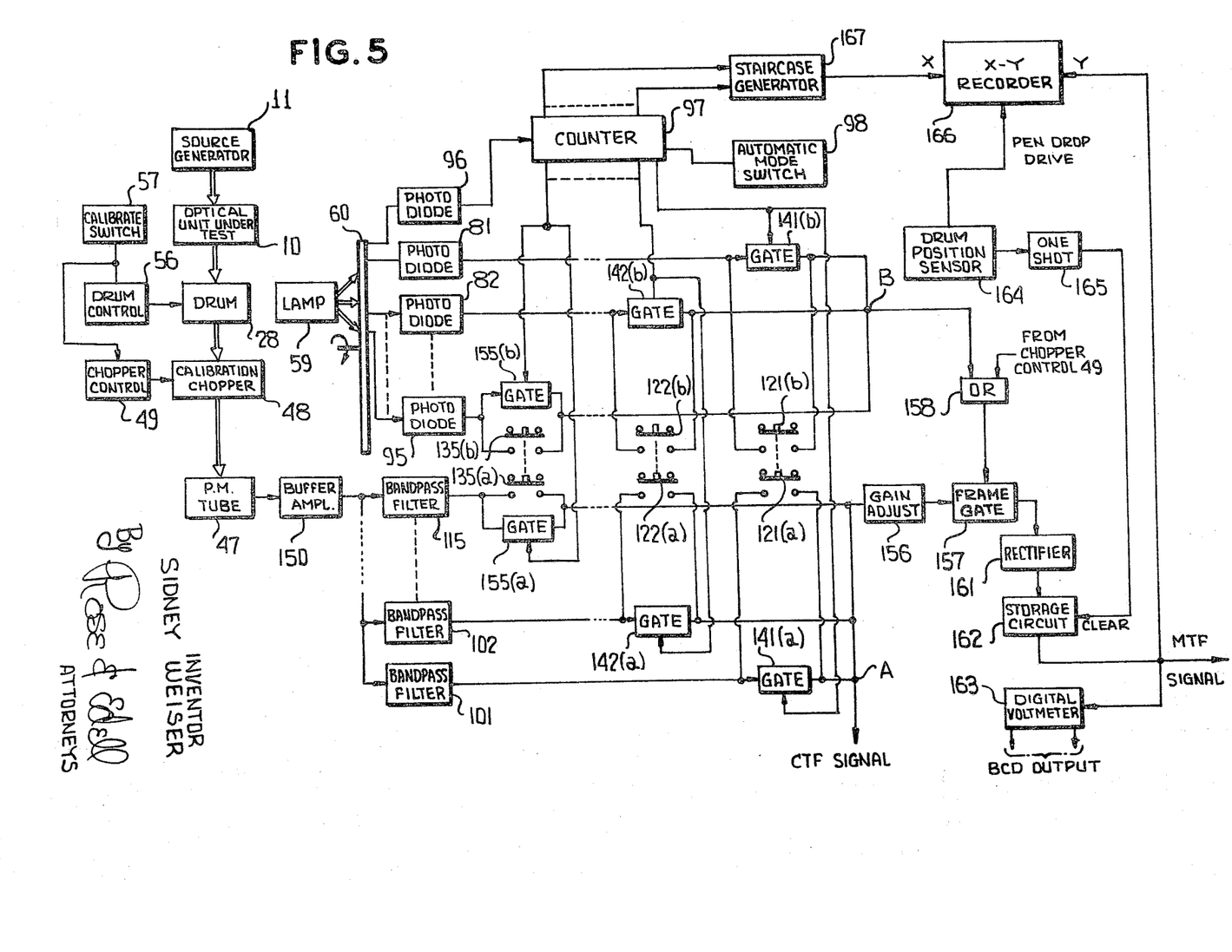
FIG. 5 is a functional block diagram illustrating the operation of the MTF measurement system of the present invention.

Operation of the systems of FIGS. 1 and 2 is best understood by reference to the functional block diagram of FIG. 5 wherein light energy flow is represented by double lines and electrical signal is represented by single lines. The light slit from source generator 11 is passed through the unit under test 10 and projected on the surface of drum 28. Transmission through the drum surface is through the light areas of the bar patterns 31–45, the light thus transmitted being conducted to photomultiplier tube 47. It is assumed that the two-bladed chopper is off and freely passes light. Drum 28 is controlled by drum control unit 56, under control of calibrate switch 57, to rotate the drum at a constant angular velocity when the system is not in the calibrate mode. When the calibrate switch is actuated, drum control unit 56 stops the drum at a position in which a light bar (i.e.) - a bar in one of the patterns which passes light) is positioned on axis A—A to continuously pass the slit image through the drum wall. Chopper control unit 49 also under the control of calibrate switch 57, rotates the two-bladed chopper 48 at a constant speed in the calibrate mode and positions the chopper to continuously pass light at all other times. Control units 56 and 49 utilize conventional motor speed and position controls to accomplish the described functions.

Figure 7:
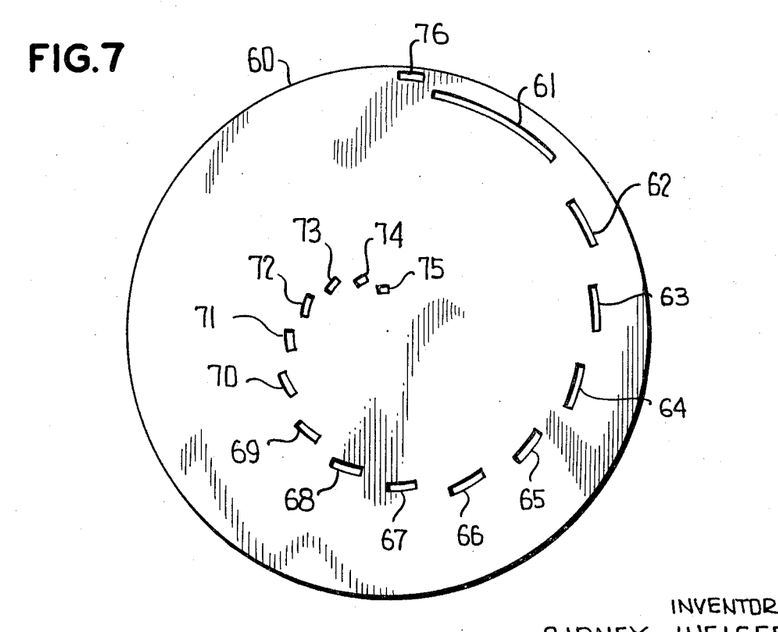
FIG. 7 is a plan view of a control disk employed in the present invention.

A lamp 59 mounted inside slit resolver 27, is positioned on one side of an apertured rotating opaque disk 60. Disk 60 is driven on the same shaft which drives drum 28. As best illustrated in FIG. 7, disk 60 is provided with sixteen light-conducting apertures 61 through 76, inclusive, located at 16 respective radial distances from the center of disk 60. Aperture 61 subtends an angle on the disk which corresponds to the angle subtended by bar pattern 31 on drum 28. The angular spacing between apertures 61 and 62 on disk 60 corresponds to the angular spacing between bar patterns 31 and 32 on drum 28. In like manner the angular length and angular spacing of apertures 62–75 correspond to the angular length and spacing of bar patterns 32–45. The extra aperture 76, not associated with a bar pattern, serves as a revolution marker for the disk.

Referring back to FIG. 5, 16 photodiodes 81–96, inclusive, are mounted in a line (representing zero reference angle) on the side of disk 60 opposite lamp 59. Each photodiode 81–96 is positioned to receive light energy from lamp 59 when a respective aperture 61–76 passes the zero reference angle as determined by the photodiode alignment. Consequently, each photodiode 81–95 provides an output pulse once for each revolution of disk 60 (and drum 28, since both are on the same shaft) during the interval that a respective bar pattern 31–45 is scanning the slit image received by slit resolver 27. Photodiode 96 provides its output pulse at the start of each disk cycle; for example, photodiode 96, in view of the aperture arrangement in FIG. 7, may provide a pulse between the pulses provided by photodiodes 95 and 81. The output pulses from photodiode 96 are applied as count pulses to a binary counter 97 which automatically recycles every 16 counts. The output pulses from each of photodiodes 81–95 are employed to open respective pairs of transmission gates to be described below.

The electrical output signal from photomultiplier 47 is fed to a buffer amplifier 100 which drives fifteen bandpass filters 101–115 in parallel. Each filter is tuned to a different frequency; specifically, each filter has a center frequency corresponding to the fundamental frequency of the square wave passed by a respective bar pattern on drum 28. Thus, depending upon the spatial frequency of bar pattern 31 and the speed of rotation of drum 28, light passing through bar pattern 31 in the form of a square wave having calculable temporal frequency. Since the speed of the drum is constant (e.g. 120 RPM), the different spatial frequencies of bar patterns 31–45 provide different temporal frequencies to which filters 101–115, respectively, are tuned. Importantly, the filters have passbands sufficiently narrow to preclude passage of all harmonic components of the square wave except the fundamental.

The output signal from each of filters 101–115 is gated by both a manually actuable switch and an automatically controlled transmission gate. The switch and gate permit either manual or automatic modes of operation, as described in detail subsequently. The manual switches are designated $121(a) - 135(a)$, inclusive, for filters 101–115 respectively. Thus, the output signal from filter 101 is connected to the normally open contacts of switch $121(a)$; when switch $121(a)$ is closed, the signal from filter 101 is passed. A similar situation exists for filters 102–115 regarding switches $122(a) - 135(a)$. The normally open contacts of all of switches $121(a) - 135(a)$ are connected to a common junction A. Importantly, switches $121(a)$ through $135(a)$ are arranged so that only switch at a time may be closed.

Transmission gates $141(a) - 155(a)$ are connected in parallel with the normally open contact of respective ones of switches $121(a) - 135(a)$. Each gate is actuable to pass signals from its associated filter upon receipt of a gating signal. These gating signals are provided from logic associated with counter 97 such that for each of counts one through 15 in counter 97, a respective one of gates $141(a)$ through $155(a)$ is gated on.

Since only one of gates $141(a) - 155(a)$ or one of switches $121(a) - 135(a)$ can pass signal from its associated filter at any time, the signal at junction A at any time can comprise no more than the fundamental frequency associated with the selected filter and bar pattern. This signal, in fact, is a measure of the contrast transfer function (CTF) and may be provided at an output jack of the unit for recording or other utilization as desired.

The signal from junction A is fed through a gain adjust circuit 156, which may be a potentiometer or other conventional amplitude adjustment circuit. A knob on the front panel of the unit permits adjustment of the gain at circuit 156.

The gain-adjusted signal is passed to a frame gate 157. This gate may be conventional transmission gate; its function is to pass the gain-adjusted CTF signal for detection only during a limited time frame determined by the bar pattern which is selected (either manually or automatically). Gating signals for frame gate 157 are derived from photodiodes 81–95 and selection logic associated therewith. The selection logic includes a switch-gate arrangement identical to that employed in selecting the output signal from the bandpass filters. More particularly, output signals from photodiodes 81–95 are fed through the normally open contacts of a respective switch $121(b) - 135(b)$; transmission gates $141(b) - 155(b)$ are connected across the normally open contacts of a respective one of switches $121(b) - 135(b)$. Switch $121(b)$ is ganged to and therefore actuable with switch $121(a)$. The same holds true for switches $122(b) - 135(b)$ relative to switches $122(a) - 135(a)$. Gating signals for gates $141(b) - 155(b)$ are the same signals employed for gates 141(a) – 155(a), respectively. Output signals from all of switches 121(b) – 135(b) and gates 141(b) – 155(b) are tied to common junction B which in turn feeds an OR gate 158 to actuate frame gate 157.

Thus, in the manual mode, if switches 121(a) and 121(b) are closed, the output signal from filter 101 is passed to junction A and the output signal from photodiode 81 is passed to junction B and frame gate 157. The output signals from all other filters and photodiodes are inhibited. Since photodiode 81 provides its output signal only when aperture 61 of disk 60 passes zero reference angle, and since bar pattern 31 is scanning the received slit image at this time, and since filter 101 is tuned to the temporal frequency generated by bar pattern 31, frame gate 157 is opened only to pass the output signal from filter 101 and nothing else. In like manner any of switch pairs 122(a), (b) – 135(a), (b), may be actuated to pass only the temporal frequency of its associated bar pattern during each drum revolution.

In practice, apertures 61–75 are arranged to actuate frame gate 157 only after its associated bandpass filter has had sufficient time to reach steady state condition, thereby eliminating passage through the frame gate of any ringing at the onset of each burst of input signal.

In the automatic mode, which is initiated by the automatic mode switch 98 on the front panel of the unit, counter 97 is operable to gate on a different pair of gates 141(a), (b) – 155(a), (b) during each revolution of drum 28. Thus, during the first revolution of the drum the signal from filter 101 is passed; during the second drum cycle the signal from filter 102 is passed; and so on until after 15 drum cycles the signals from all of the filters have been passed.

The signal passed by frame gate 157 is peak detected by rectifier 161 and storage circuit 162 and measured by digital volt meter 163. The output signal from storage circuit 162 is the MTF signal. Storage circuit 162 is primarily an integrator circuit of the type which can be cleared in response to a CLEAR signal. Integrators of this type are well-known, an example being disclosed in U.S. Pat. No. 2,761,968 to Kuder. In the present system, storage circuit 162 is cleared just prior to each gating interval of frame gate 157, thereby permitting the storage circuit to respond for the next measurement without the influence of residue signal from the previous measurement. To effect this clearing, a drum position sensor 164 provides a pulse just prior to onset of a scan by a bar pattern. Sensor 164 may, for example, be a contact resiliently engaging the metal drum 28, contact being broken periodically as necessary by circumferentially spaced insulators on the drum. With each breaking of contact, one shot multivibrator 165 is triggered to provide a CLEAR pulse for storage circuit 162. Under this arrangement the CLEAR pulse may be generated fifteen times each drum cycle (i.e. - before each bar pattern initiates a scan), once each drum cycle (such as at the time the count pulse from photodiode 96 is generated) or at any combination of times depending upon the number of sensors and the complexity of logic gating employed.

The MTF signal from storage circuit 162 is also applied to the Y input of an X-Y recorder 166 which has its primary utilization in the automatic mode of the system. Recorder 166 may, for example, be Hewlett Packard Model 7035-B. The X-scale of the recorder is calibrated in terms of spatial frequency to provide an immediate plot of MTF over the spatial frequencies scanned. Calibration of the X-scale in spatial frequency utilizes the count in counter 97. Specifically, since in the automatic mode counter 97 controls which bar pattern scan is to be operative in each cycle, each count signifies a different spatial frequency. This count is transformed into a signal level by staircase generator 167. The latter provides a different output signal level at the X-input of recorder 166 for each count in counter 96. The output signal versus input count characteristic of the staircase generator is not necessarily linear but rather is the inverse of the relationship between the count in counter 96 and the spatial frequency represented thereby. Since the spatial frequencies of the bar patterns are known, this "weighting" or non-linearity of the staircase generator is easily and accurately provided. Recorder 166 therefore provides an immediate plot of MTF versus spatial frequency in the automatic mode. Control over pen drop at the recorder is effected by the drum position sensor and associated logic so that the pen contacts the recording medium only during a measurement interval and not between measurements; thus the recorded plot is a series of dots, one for each spatial frequency at a y-axis excursion corresponding to the measured MTF at that spatial frequency.

The MTF signal may be provided at a panel jack for external utilization as necessary. In addition, digital volt meter 163 provides a binary coded decimal output signal suitable for recording on tape, drum, disc, or other storage medium.

Implicit in the operation of the system described above is the recognition that the amplitude of the fundamental frequency of each of the square wave patterns passed by drum 28 is proportional to the MTF of the unit under test at the spatial frequency of the bar pattern producing that square wave. Even more importantly, the present system makes it possible to provide an instantaneous MTF measurement at any desired spatial frequency and to provide an instantaneous measurement across a spectrum of spatial frequencies. For example, if 15 bar patterns are spaced on drum 28, and if the drum is rotated at 120 rpm, it takes only 7.5 seconds to provide a plot of MTF versus the fifteen spatial frequencies.

Because of the gating arrangement employed for the filters, measurements at discrete spatial frequencies are possible without interference by other spatial frequencies. The gating arrangement also permits the filters to achieve steady state condition during a scan before measurement is made.

Calibration of the system is effected by the chopper 48. Specifically, when the calibrate switch 57 is actuated, the drum is automatically stopped at a clear pattern opening and the two-blade chopper is rotated at a constant speed. The speed of the chopper is chosen to provide an output square wave equal to the center frequency of any of the bandpass filters. The resulting square wave signal exhibits no distortion and therefore represents 100 percent modulation. By zero-adjusting the digital volt meter 163 and properly adjusting the gain at circuit 156, the system can be calibrated in the absolute sense to register anything less than 100 percent modulation. Gating signals for the frame gate are provided via the chopper control unit 58 through OR gate 158.

The present invention has been described above in terms of a system in which a stationary slit of light is passed through a unit under test and the output image is then scanned. The principles of the present invention apply also to a system in which the input slit is itself scanned and a constant slit image is analyzed. Such a system is illustrated in infinite conjugate form in FIG. 3 wherein light source 16 has its output conducted into slit resolver 27 where it is passed through the bar patterns on rotating drum 28. The scanned slit output is passed through a series of relay lenses 171, 172, 173 and is reflected by reflecting members 51, 52 through the unit under test. The image is then received at objective 23 of microscope 24, passed through rotary slit 19 and sensed by photomultiplier 47. The sensed light is analyzed in the same manner described relative to FIG. 5 to determine degradation of the slit by the unit under test in terms of MTF.

Figure 3:
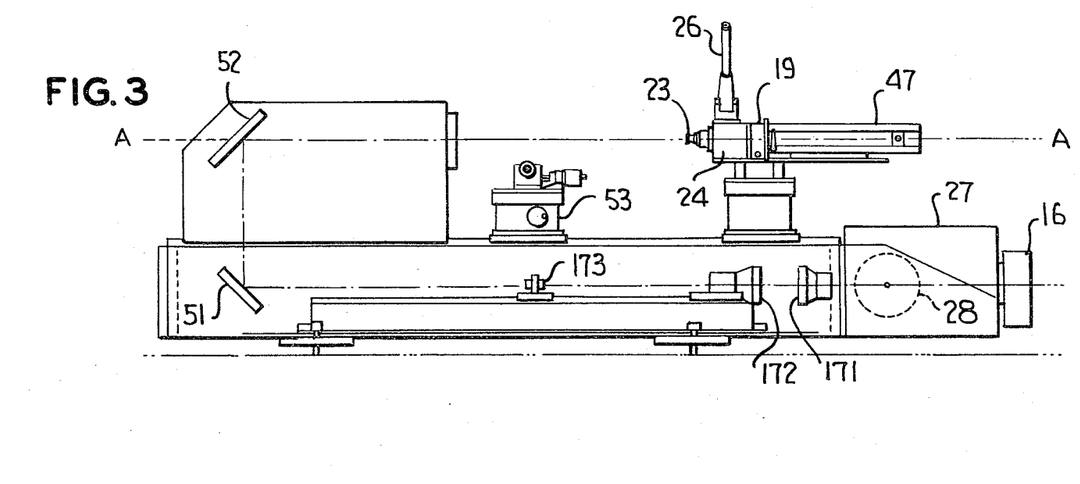
FIG. 3 is a plan view of a second alternative embodiment of the MTF measurement system according to the present invention.

An inherent advantage of the arrangement of FIG. 3 is the constant slit width at the analyzer which provides a more critical spread function of the bar patterns. While set up may be somewhat longer than for the system of FIG. 2, alignment and operation are just as rapid. A very important additional feature in FIG. 3 is the static display of the bar patterns at microscope 24. In FIGS. 1 and 2 the microscope views only the slit image before it is scanned; therefore visual analysis is somewhat limited. In FIG. 3 the visual examination of bar pattern degradation is possible.

The number of bar patterns employed and their spatial frequencies are a matter of choice. Important, however, is the fact that the bar patterns are spaced sufficiently to permit discrete gating of the resulting temporal frequencies and thereby avoid problems associated with filter ringing and bar pattern overlap.

While I have described and illustrated specific embodiments of my invention, it will be clear that variations of the details of construction which are specifically illustrated and described may be resorted to without departing from the true spirit and scope of the invention as defined in the appended claims.

I claim:

1. A device for determining the image-forming quality of an optical system by employing bar patterns of different spatial frequencies, said device comprising in combination:
   a drum rotating at constant speed;
   partially transparent bar patterns of different spatial frequencies mounted in spaced relation along the circumference of said drum;
   means for projecting an image of a slit by the optical system whose image-forming quality is to be determined onto and through said rotating drum so that said bar patterns perform a scanning of said slit image and produce optical signals;
   a photoelectric receiver energized by said optical signals produced by the scanning operation for converting said optical signals into electrical signals;
   means for amplifying said electric signals;
   a plurality of signal paths connected in parallel to receive said electrical signals, each signal path including a narrow band electrical filter tuned to a respective temporal frequency which is equal to the spatial frequency of a respective bar pattern multiplied by a factor determined by the speed of said drum;
   synchronized signal interruption means disposed in each signal path for permitting signal flow through only one signal path at a time;
   means for detecting output signals from said signal paths to provide voltages which are proportional to the modulation functions of said optical system;
   means for displaying the relative values of said voltages for obtaining a relative comparison of said modulation transfer function.

2. A system for measuring the modulation transfer function of an optical unit under test, said system comprising:
   means for directing a slit of light along an optical path extending through said unit under test to provide an image of said slit formed by said unit;
   means for modulating said image of said slit of light by passing a series of bar patterns at constant speed through said optical path, each bar pattern comprising a series of alternating opaque and transparent bars spaced with a discrete spatial frequency, each bar pattern having a different spatial frequency;
   photosensitive means at the end of said path for receiving the modulated image of said slit of light and converting it into electrical signals of amplitude proportional to the intensity of the received light;
   a plurality of electrical signal paths connected in parallel to receive said electrical signals, one signal path for each of said bar patterns, each signal path including a bandpass filter, each filter being tuned to a different frequency equal to the modulation frequency produced by a corresponding bar pattern moving across said optical path at said constant speed;
   synchronized signal interruption means disposed in each signal path for permitting signal flow through only one signal path at a time; and
   means for detecting the signal passed by the selected filter to provide a measure of the modulation transfer function of the unit under test at the spatial frequency of the bar pattern corresponding to the selected filter.

3. The system according to claim 2 wherein said bar patterns are disposed circumferentially about a drum rotating at constant speed, each bar pattern being spaced from its preceding and succeeding bar pattern by an opaque region considerably wider than the bars in any of said bar patterns.

4. The system according to claim 3 wherein said signal interruption means includes means for permitting signal flow through said only one signal path during at least one complete rotation period of said drum.

5. The system according to claim 4 wherein said signal interruption means includes means for automatically changing the one signal path through which signal is permitted to flow after each complete rotation period of said drum.

6. The system according to claim 3 wherein said signal interruption means includes manually actuable means for selecting one signal path to pass signal for multiple successive rotation periods of said drum.

7. The system according to claim 3 wherein said means for detecting includes: a storage circuit for storing the detected signal for measurement purposes; and means for clearing said storage circuit of its stored signal prior to the next passing of signal through a selected signal path.

8. The system according to claim 7 further comprising:
   means for counting rotations of said drum;
   means for automatically selecting successive signal paths to pass signal during successive rotations of said drum according to the rotation count;
   an x-y recorder;
   means for driving the y-input of said recorder with the detected peak of signal passed by the selected signal path; and
   means for driving the x-input of said recorder with a signal having an amplitude which is a predetermined function of the rotation count.

9. The system according to claim 8 wherein said predetermined function relates the rotation to the spatial frequency of the bar pattern corresponding to the selected signal path to provide a linear spatial frequency scale on said x-y recorder.

10. The system according to claim 3 further comprising calibration means for providing an absolute calibration of said system, said calibration means comprising means for terminating rotation of said drum and chopper means for alternately blocking and passing light along said optical path at a frequency equal to the tuned frequency of one of said filters.

11. The system according to claim 3 further comprising means for enabling both tangential and sagittal measurements of said modulation transfer function to be performed on said unit under test, said last mentioned means comprising means for rotating said slit of light and said drum each by 90° about said optical path.

12. The system according to claim 3 further comprising a microscope positioned in said optical path to permit viewing of the image of said slit of light as passed through said unit under test.

13. The system according to claim 3 wherein said means for directing a slit of light includes a rotatable slit member interposed in said optical path, said rotatable slit member including a vernier control for accurately controlling the rotational position of said slit of light relative to said optical path.

14. A method for measuring the modulation transfer function of an optical unit under test, said method comprising:
   directing a slit of light along an optical path extending through said unit under test;
   modulating said slit of light by passing a series of spaced bar patterns at constant speed through said optical path, each bar pattern comprising a series of alternating opaque and transparent bars spaced with a discrete spatial frequency, each bar pattern having a different spatial frequency;
   receiving the modulated slit of light and converting it into electrical signals of amplitude proportional to the intensity of the received light;
   passing said electrical signals to a plurality of signal paths connected in parallel, one signal path for each of said bar patterns, each signal path including a respective bandpass filter, each filter being tuned to a different frequency equal to the modulation frequency produced by its corresponding bar pattern moving across said optical path at said constant speed;
   selectively interrupting all but one selected signal path; and
   detecting the signal passed by the selected signal path to provide a measure of the modulation transfer function of the unit under test at the spatial frequency of the bar pattern corresponding to the filter in the selected signal path.

15. The method according to claim 14 wherein said bar patterns of different frequency are spaced along a continuous path arranged to pass through said optical path; and wherein said step of selectively interrupting includes the step of passing signal through only the selected signal path during a complete cycle of passage of said continuous path through said optical path.

16. The method according to claim 15 wherein the selected signal path is automatically changed for successive cycles of passage of said continuous path through said optical path.

17. The method according to claim 15 wherein the selected signal path is selected to pass signal for plural successive cycles of passage of said continuous path through said optical path.

18. The system according to claim 1 further comprising means for automatically changing the signal path through which signal flow is permitted during successive rotation cycle of said drum.

19. The system according to claim 1 wherein said signal interruption means is operative to limit signal flow to said only one signal path for at least a complete rotation cycle of said drum.

20. The system according to claim 1 wherein said means for detecting includes: a storage circuit for storing the detected signal for measurement purposes; and means for clearing said storage circuit of its stored signal prior to the next passing of signal through a selected signal path.

21. The system according to claim 20 further comprising:
   means for counting rotations of said drum;
   means for automatically selecting successive signal paths to pass signal during successive rotations of said drum according to the rotation count;
   an x-y recorder;
   means for driving the y-input of said recorder with the detected peak of signal passed by the selected signal path; and
   means for driving the x-input of said recorder with a signal having an amplitude which is a predetermined function of the rotation count.

22. The system according to claim 1 further comprising means for providing an absolute calibration of said system including chopper means, operable upon termination of drum rotation, for alternately blocking and passing light to said photoelectric receiver at a frequency equal to the tuned frequency of one of said filters.

23. The system according to claim 1 further comprising a microscope positioned to permit viewing of the image of the slit of light.

* * * * *